US008777165B2

(12) United States Patent
Roscoe et al.

(10) Patent No.: US 8,777,165 B2
(45) Date of Patent: Jul. 15, 2014

(54) AIRCRAFT FUEL SYSTEM

(75) Inventors: Paul Roscoe, Bristol (GB); Emmanuel Lehuunho, Bristol (GB)

(73) Assignee: Airbus Operations Limited, Bristol (GB)

( * ) Notice: Subject to any disclaimer, the term of this patent is extended or adjusted under 35 U.S.C. 154(b) by 41 days.

(21) Appl. No.: 13/346,858

(22) Filed: Jan. 10, 2012

(65) Prior Publication Data

US 2012/0193479 A1     Aug. 2, 2012

(30) Foreign Application Priority Data

Jan. 28, 2011   (GB) .................................. 1101463.6

(51) Int. Cl.
  *B64D 37/08*     (2006.01)
  *B64D 37/14*     (2006.01)

(52) U.S. Cl.
  USPC ................ 244/135 R; 244/135 C; 244/136

(58) Field of Classification Search
  USPC .......... 244/135 R, 136, 135 C; 137/209, 212, 137/574
  See application file for complete search history.

(56) References Cited

U.S. PATENT DOCUMENTS

| | | | | |
|---|---|---|---|---|
| 2,850,083 | A * | 9/1958 | Frost ............................. | 137/576 |
| 3,419,233 | A * | 12/1968 | Wotton ..................... | 244/135 R |
| 3,587,618 | A * | 6/1971 | Kenyon ..................... | 137/87.06 |
| 3,732,668 | A * | 5/1973 | Nichols ........................... | 96/174 |
| 3,788,039 | A * | 1/1974 | Bragg ............................. | 96/174 |
| 5,979,481 | A | 11/1999 | Ayresman | |
| 7,204,868 | B2 * | 4/2007 | Snow, Jr. ............................ | 96/4 |
| 7,442,230 | B2 * | 10/2008 | Snow, Jr. ............................. | 95/1 |
| 7,509,968 | B2 * | 3/2009 | Surawski ....................... | 137/209 |
| 7,621,483 | B2 * | 11/2009 | Cozens et al. ............. | 244/135 R |
| 7,918,358 | B2 * | 4/2011 | Gupta ........................... | 220/88.3 |
| 7,921,869 | B2 * | 4/2011 | Surawski ....................... | 137/209 |
| 7,955,424 | B2 * | 6/2011 | Gupta .............................. | 96/108 |
| 8,074,932 | B2 * | 12/2011 | Surawski .................. | 244/135 R |
| 8,128,739 | B1 * | 3/2012 | Gupta .............................. | 96/108 |
| 8,192,532 | B1 * | 6/2012 | Gupta .............................. | 95/288 |
| 8,313,061 | B2 * | 11/2012 | Surawski .................. | 244/129.2 |
| 2003/0218098 | A1 * | 11/2003 | Goto et al. ................ | 244/135 R |
| 2005/0247197 | A1 * | 11/2005 | Snow, Jr. ......................... | 95/138 |
| 2006/0021652 | A1 * | 2/2006 | Surawski ...................... | 137/209 |
| 2007/0144347 | A1 * | 6/2007 | Snow, Jr. .......................... | 95/138 |
| 2009/0071340 | A1 * | 3/2009 | Surawski ............................. | 96/4 |
| 2011/0061539 | A1 * | 3/2011 | Lam et al. ....................... | 96/112 |
| 2012/0035406 | A1 * | 2/2012 | Lam et al. ..................... | 585/860 |

FOREIGN PATENT DOCUMENTS

GB        1416352 A    12/1975
WO     0228714 A1    4/2002

OTHER PUBLICATIONS

Search Report for GB 1101463.6 dated May 26, 2011.

* cited by examiner

*Primary Examiner* — Philip J Bonzell
(74) *Attorney, Agent, or Firm* — Lowe Hauptman & Ham, LLP

(57) ABSTRACT

An aircraft fuel system has a fuel tank with first and second cells separated by one or more baffles. A venting system reduces pressure difference between the interior and exterior of the fuel tank, and an inerting system supplies oxygen-depleted gas to the fuel tank. The baffles permit the flow of fluid between the cells. The venting system has one or more vent nozzles within the fuel tank and in fluid communication with one or more vent ports. The inerting system has one or more inerting nozzles for injecting oxygen-depleted gas into the first and second cells. A control device varies the ratio between the total flow rates of the oxygen-depleted gas into the first and second cells.

9 Claims, 7 Drawing Sheets

AIRCRAFT FUEL SYSTEM

RELATED APPLICATIONS

The present application is based on, and claims priority from, British Application Number 1101463.6, filed Jan. 28, 2011, the disclosure of which is hereby incorporated by reference herein in its entirety.

FIELD OF THE INVENTION

The present invention relates to an aircraft fuel system with a fuel tank, a venting system for reducing pressure difference between the interior and exterior of the fuel tank, and an inerting system for supplying oxygen-depleted gas to the fuel tank.

BACKGROUND OF THE INVENTION

U.S. Pat. No. 7,204,868 describes a conventional aircraft fuel system with a fuel tank, a venting system for reducing pressure difference between the interior and exterior of the fuel tank, and an inerting system for supplying oxygen-depleted gas to the fuel tank. During descent, oxygen-rich air flows into the tank via the venting system and nitrogen-enriched air (NEA) from an air separation module (ASM) is injected into the venting system to pre-inert the vent in-flux. During a fast descent, NEA air is also injected into the tank via a separate set of inerting nozzles.

This system is good during ideal descent cases but for descents that include, for example, loiter or go-around, i.e. where the aircraft levels out in altitude or ascends, the NEA within the surge tank and vent line will expel overboard, which does not reduce the burden on ASM performance and so the ASM size (and therefore weight and cost) is not optimised.

Another problem with the arrangement of U.S. Pat. No. 7,204,868 is that a large number of heavy vent pipes and vent nozzles are required in order fully vent all parts of the fuel tank.

SUMMARY OF THE INVENTION

A first aspect of the invention provides an aircraft fuel system comprising:
  a. a fuel tank with first and second cells separated by one or more baffles, the baffles permitting the flow of fluid between the first and second cells;
  b. a venting system for reducing any pressure difference between the interior and the exterior of the fuel tank, the venting system comprising one or more vent nozzles which are positioned within the fuel tank and in fluid communication with one or more vent ports, wherein the venting system has a venting capacity associated with each cell, and wherein the venting capacity associated with the first cell is greater than the venting capacity associated with the second cell, which may be zero; and
  c. an inerting system comprising:
    i. one or more gas sources for generating oxygen-depleted gas;
    ii. one or more inerting nozzles for injecting oxygen-depleted gas from the gas source(s) into the first cell, where F1 is the sum of the oxygen-depleted gas flow rates from the inerting nozzle(s) into the first cell;
    iii. one or more inerting nozzles for injecting oxygen-depleted gas from the gas source(s) into the second cell, where F2 is the sum of the oxygen-depleted gas flow rates from the inerting nozzle(s) into the second cell; and
    iv. a control device for varying the ratio F1/F2 between the flow rates into the first and second cells.

A further aspect of the invention provides a method of operating an aircraft fuel tank system, the fuel tank system comprising: a fuel tank with first and second cells separated by one or more baffles; a venting system comprising one or more vent nozzles which are positioned within the fuel tank; and an inerting system comprising one or more inerting nozzles in the first cell and one or more inerting nozzles in the second cell, the method comprising:
  a. during cruise of the aircraft:
    i. introducing oxygen-depleted gas into the first cell at a flow rate F1(cruise), wherein F1(cruise) is the sum of the oxygen-depleted gas flow rates from the inerting nozzle(s) into the first cell and wherein F1(cruise) may be zero; and
    ii. introducing oxygen-depleted gas into the second cell at a flow rate F2(cruise), wherein F2(cruise) is the sum of the oxygen-depleted gas flow rates from the inerting nozzle(s) into the second cell; and
  b. during descent of the aircraft:
    i. operating the venting system to introduce air into at least the first cell through one or more of the vent nozzles in order to reduce a pressure difference between the interior and the exterior of the fuel tank, wherein the total air flow rate from the venting system into the first cell is greater than the total air flow rate from the venting system into the second cell, which may be zero;
    ii. introducing oxygen-depleted gas into the first cell at a flow rate F1(descent), wherein F1(descent) is the sum of the oxygen-depleted gas flow rates from the inerting nozzle(s) into the first cell; and
    iii. introducing oxygen-depleted gas into the second cell at a flow rate F2(descent), wherein F2(descent) is the sum of the oxygen-depleted gas flow rates from the inerting nozzle(s) into the second cell and wherein F2(descent) may be zero; and
  c. after step b., permitting gas to flow across the baffle(s) between the cells in order to reduce any difference in oxygen concentration between them,
  wherein the ratio of oxygen-depleted gas flow rates F1(descent)/F2(descent) during descent is greater than the ratio of oxygen-depleted gas flow rates F1(cruise)/F2(cruise) during cruise.

The invention enables the weight and complexity of the venting system to be minimised. Specifically, venting nozzles are only required in the first cell, and the second cell may either have no vent nozzles or may have one or more relatively small vents nozzles with a relatively small capacity.

The difference in venting capacity between the two cells may be achieved in a number of ways. For instance the first cell may contain more vent nozzles than the second cell and/or the first cell may contain larger vent nozzles than the second cell and/or the venting system may have larger pipes leading to the nozzles in the first cell than the second cell. In general terms the venting system typically has a fluid impedance associated with each vent nozzle (typically defined by a minimum cross-sectional flow area of that nozzle or the pipes leading to it) and the sum of the fluid impedances associated with the vent nozzles in each cell of the fuel tank defines the venting capacity for that cell, which is greater for the first cell than for the second cell.

A problem introduced by this unequal venting capacity is that the oxygen concentration may increase to an unacceptable level in the first cell. This unequal venting capacity is counteracted in two ways: firstly, by providing the ability for gas to flow across the baffle(s) between the cells in order to reduce any difference in oxygen concentration between them; and secondly, by focussing the oxygen-depleted gas flow from the inerting system into the first cell during descent. During cruise, when relatively little air is entering the tank via the venting system, the control device of the inerting system can be operated to introduce oxygen-depleted gas into the second cell (and optionally other cells of the fuel tank) so that the oxygen-depleted gas is less likely to exit the tank immediately via the venting system.

The first cell may comprise a bay with no internal baffles, or it may comprise a compartment containing one or more internal baffles which divide the compartment into a number of bays and permit the flow of fluid between the bays. Similarly, the second cell may comprise a bay with no internal baffles, or it may comprise a compartment containing one or more internal baffles which divide the compartment into a number of bays and permit the flow of fluid between the bays. Where internal baffles are provided, then typically they permit a greater rate of flow between the bays than the baffles between the cells.

The inerting system may comprise a pair of separate gas sources, each gas source inerting a respective one of the two cells. In this case the ratio F1/F2 between the flow rates into the first and second cells can be adjusted by adjusting a flow setting of one of the gas sources relative to the other. However more preferably the inerting system comprises a network of inerting pipes which couple the inerting nozzles in both cells to a common gas source, and the control device comprises a valve with a first setting in which the common gas source is coupled to the nozzle(s) in the first cell and decoupled from the nozzle(s) in the second cell, and a second setting in which the common gas source is coupled to the nozzle(s) in the second cell and decoupled from the nozzle(s) in the first cell.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
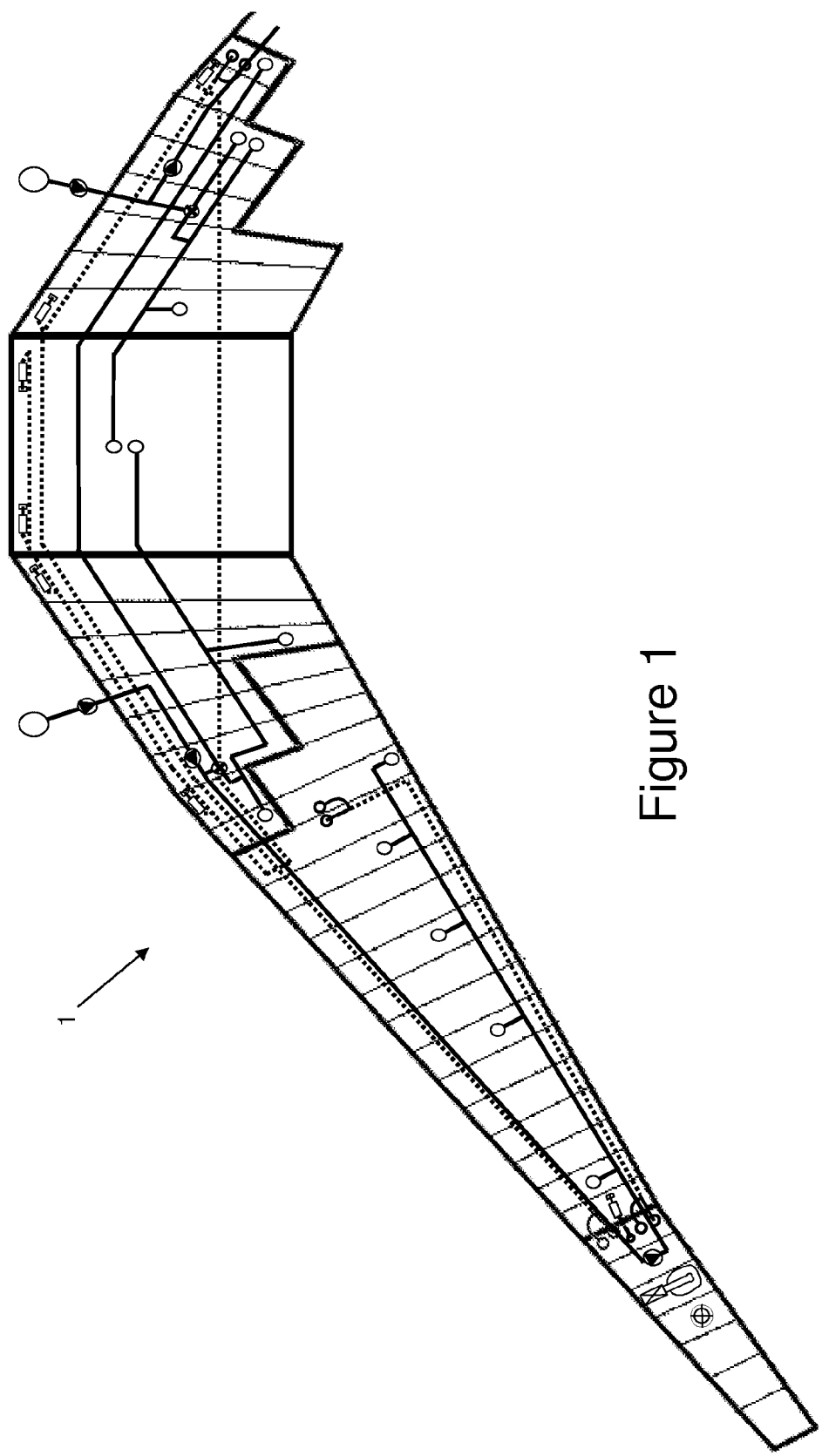
FIG. 1 is a plan view of part of an aircraft fuel tank system.

FIG. 1 is a plan view of part of an aircraft fuel tank system 1. The various elements of the system are shown together in FIG. 1, and separately in FIGS. 2-4.

Figure 2A:
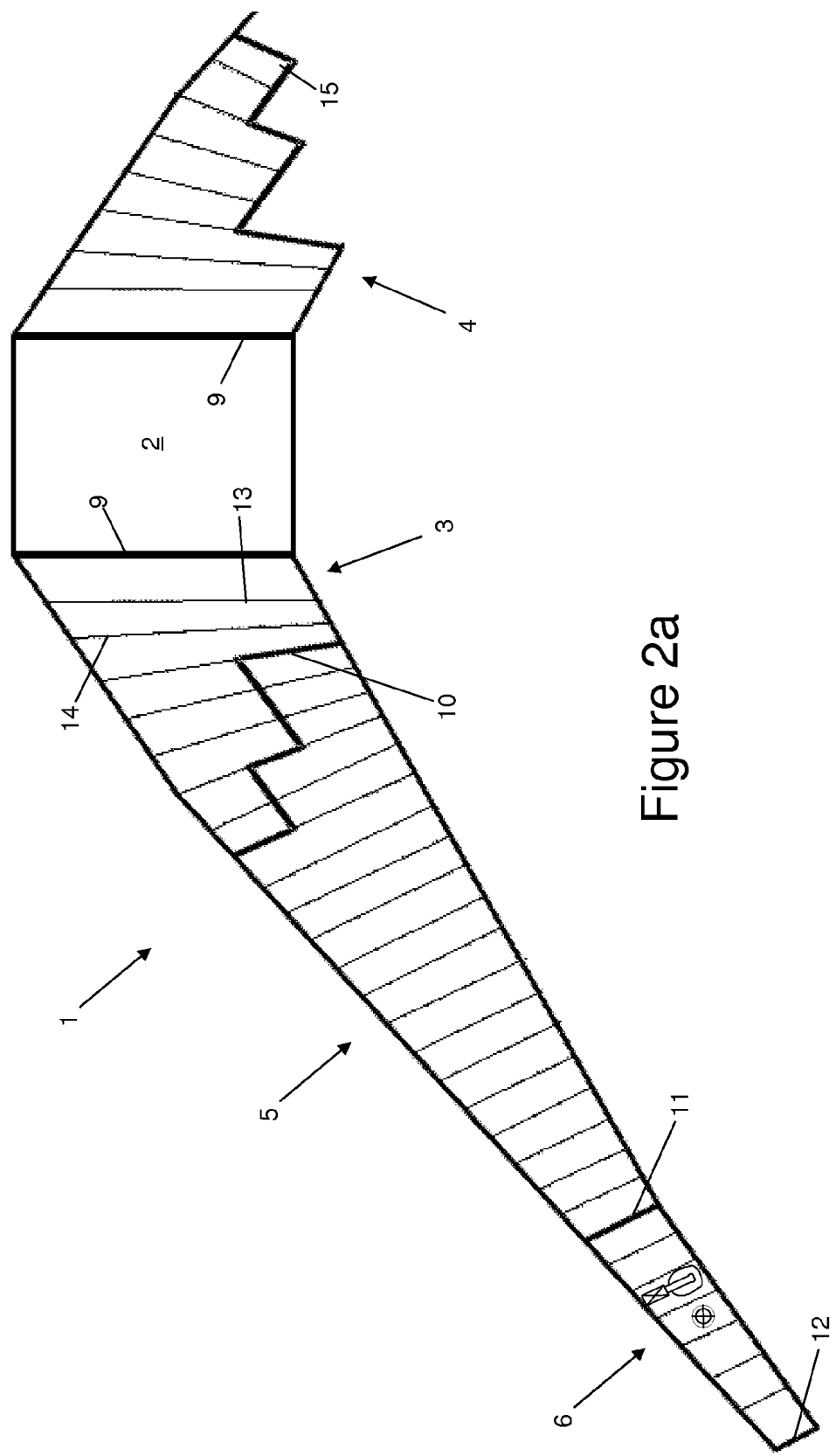
FIG. 2a is a plan view of the system with the inerting system and venting system omitted.

The fuel tank system 1 comprises a set of fuel tanks, a venting system and an inerting system. FIG. 2a shows the fuel tank system 1 with the inerting system and venting system omitted. The system 1 comprises a centre wing tank with a fuel tank bay 2 (located under the aircraft fuselage) and port and starboard inner wing fuel tank compartments 3,4; port and starboard outer wing fuel tanks (only the port outer wing fuel tank 5 being shown); and port and starboard surge tanks (only the port surge tank 6 being shown). The centre bay 2 is bounded by a pair of ribs 9; the inner wing compartment 3 is bounded by rib 9 and a staggered wall 10 (shown in a thick line); the outer wing tank 5 is bounded by wall 10 and a rib 11; and the surge tank is bounded by rib 11 and an outermost rib 12. The tanks are bounded fore and aft by spars (not labelled) and up and down by wing skins (also not shown). Thirty four intermediate ribs are also present (shown in thin lines) including for example rib 13 and rib 14. These intermediate ribs divide each inner wing compartment 3,4 into eight bays, each outer wing tank 5 into nineteen bays, and each surge tank into seven bays.

The wall 10 and the rib 11 provide a complete barrier to fuel and gas, preventing fuel and gas from transferring between the outer wing tank 5 and the inner wing compartment 3. In contrast, holes are provided in the ribs 9 so a small amount of fluid flow is permitted between the centre bay 2 and the inner wing compartments 3,4. Holes are also provided in the intermediate ribs, permitting a relatively large amount of fluid flow between the bays.

Figure 2B:
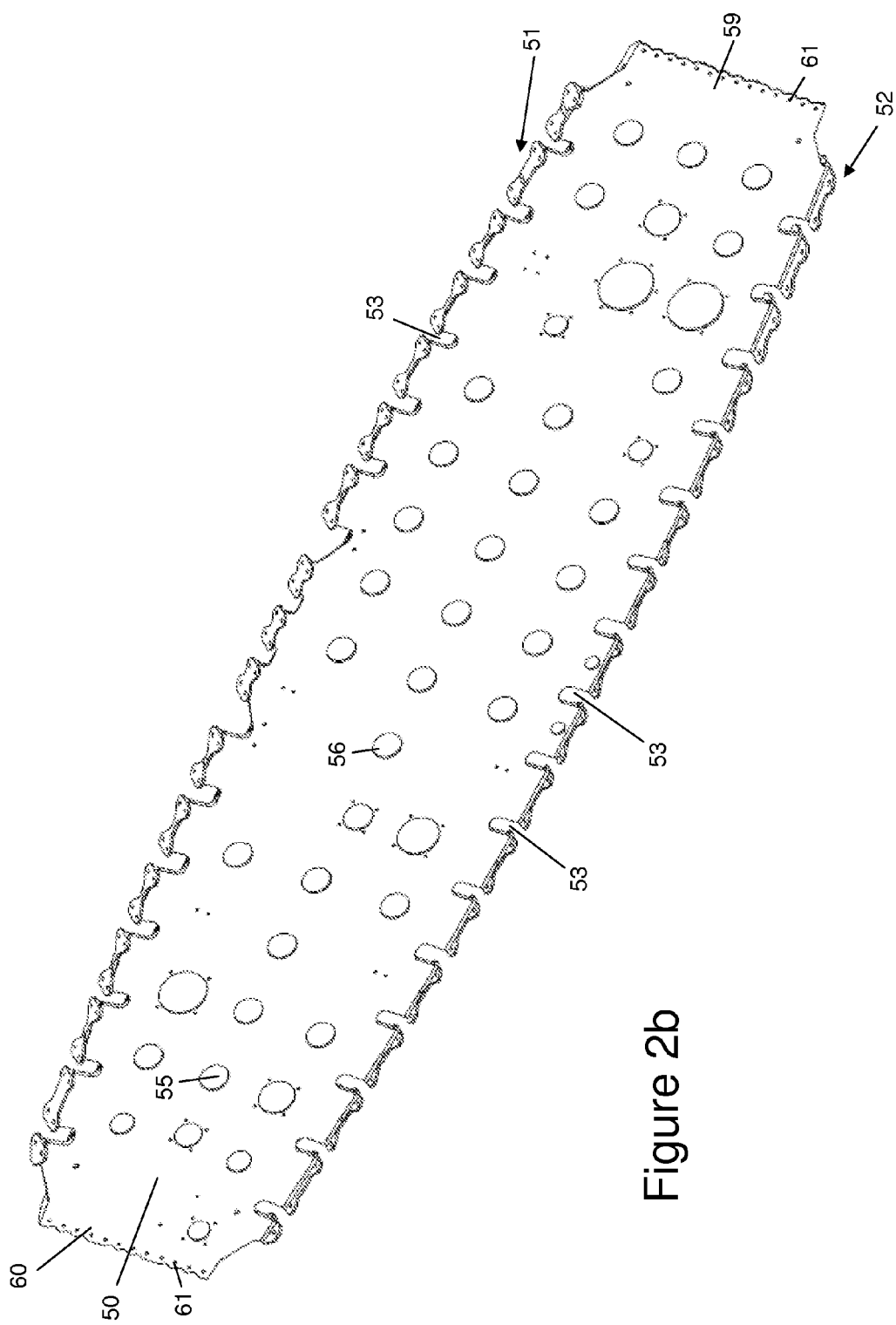
FIG. 2b is a perspective view of an exemplary one of the ribs.

FIG. 2b shows an exemplary one of the ribs. All of the ribs are slightly different and this rib is shown in FIG. 2b merely be way of example. The rib has a planar rib web 50 with a series of upper rib feet 51 extending from an upper edge of the rib web and a series of lower rib feet 52 extending from a lower edge of the rib web.

Mouse holes 53 are formed between each adjacent pair of upper rib feet 51 and each adjacent pair of lower rib feet 52. The upper and lower skins of the wing carry stringers (not shown) on their inner faces which run in a span-wise direction along the wing and each stringer passes through a respective mouse hole 53. During assembly of the wing box 1, the rib feet are bolted to the upper and lower covers. The spars carry rib posts (not shown) and the forward and aft ends 59, 60 of the rib are bolted to the rib posts by bolts (not shown) passing in a span-wise direction through bolt holes 61.

The rib web 50 has circular holes 55,56 which allow fuel and gas to pass through the rib. The holes 55,56 also serve to reduce the weight of the rib. Fuel and gas can also flow through the mouse holes 53.

The total area of each rib 9 is 9.58 $m^2$, and holes with a total area of 0.2541 $m^2$ are provided in each rib 9, giving a ratio of 0.0265. By contrast, the intermediate ribs permit a greater rate of flow between the bays than the ribs 9. For instance the total area of rib 13 is 8.1616 $m^2$, and holes with a total area of 1.2596 $m^2$ are provided in the rib 13, giving a ratio of 0.1543. The ratio for rib 14 is also relatively high (0.1113).

Figure 3:
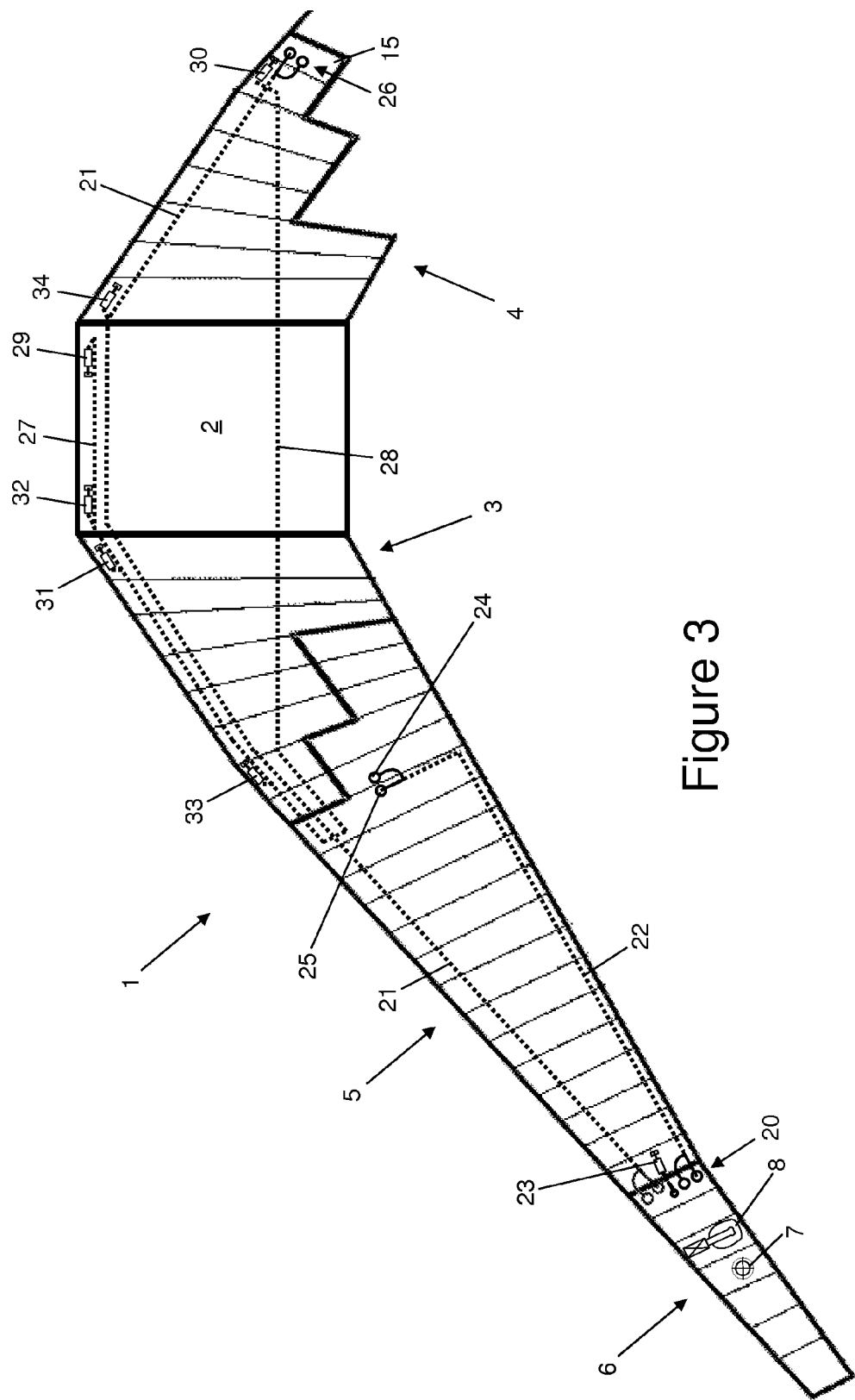
FIG. 3 is a plan view of the system with the inerting system omitted.

FIG. 3 shows the venting system. The venting system has various vent pipes (shown in dotted lines), vent ports and vent nozzles. Starting from the left of FIG. 3, the venting system has five vent ports 20 each located in the innermost bay of the surge tank 6. Two of the ports 20 are connected in parallel to a large diameter vent pipe 21; two of the ports 20 are connected in parallel to a large diameter vent pipe 22; and one of the ports 20 is connected to a float vent nozzle 23 in the outermost bay of the outer wing tank 5.

The large diameter vent pipe 22 is connected to a bell-mouth nozzle 24 in the fifth bay of the tank 5 and a bell-mouth nozzle 25 in the sixth bay of the tank 5. The large diameter pipe 21 is connected to a pair of bell-mouth nozzles 26 in the outermost bay 15 of the compartment 4. Small diameter vent pipes 27,28 branch off from the vent pipe 21 and lead to float vent nozzles 29 and 30 respectively. Small diameter vent pipes (not labelled) branch off from the vent pipe 27 and lead to float vent nozzles 31-33. A small diameter vent pipe (not labelled) also branches off from the vent pipe 21 and leads to a float vent nozzle 34.

The vent pipe 21 has a diameter of about 5 inches (12.7 cm) and the bell-mouth nozzles 26 have a diameter of about 4.5 inches (11.4 cm). In contrast, the vent pipes 27, 28 and the float vent nozzles 23, 29-34 have a diameter of about 2 inches (5.1 cm). Thus the venting system has a venting capacity associated with the bay 15 which is greater than the venting capacity associated with the other bays and compartments in the centre fuel tank. In other words, the pipe 21 and nozzles 26 have a larger cross-sectional flow area so they tend to introduce air into the bay 15 at a much higher flow rate. The diameter of the bell-mouth nozzles 26 is slightly smaller than the diameter of the vent pipe 21 in order to prevent debris from entering the nozzles 26 and blocking the pipe 21. Since the operation of the float vent nozzles is less critical, they have a similar diameter to the vent pipes which connect them to the large vent pipe 21.

The arrangement of FIG. 3 enables the weight and complexity of the venting system to be minimised. Specifically, only a small number of large bell-mouth nozzles 26 and large vent pipes 21 are required, which reduces weight compared with a system in which all of the vent nozzles and pipes are large. Also, only some of the bays contain vent nozzles (which reduces weight and complexity) but the pressure in the non-vented bays is equalised by the flow of gas across the intermediate ribs.

The nozzles 26 are located towards the top of bay 15, which is not completely full of fuel even when the fuel system is fully loaded. The float vent nozzles 23, 29-34 are located in bays which can be completely full of fuel, and they float on top of the fuel.

By placing the large nozzles 26 in the starboard bay 15 and coupling them to the port surge tank 6, the risk of fuel flowing out of the centre bay 2 or compartments 3,4 via the venting system during a roll manoeuvre is minimised.

Figure 4:
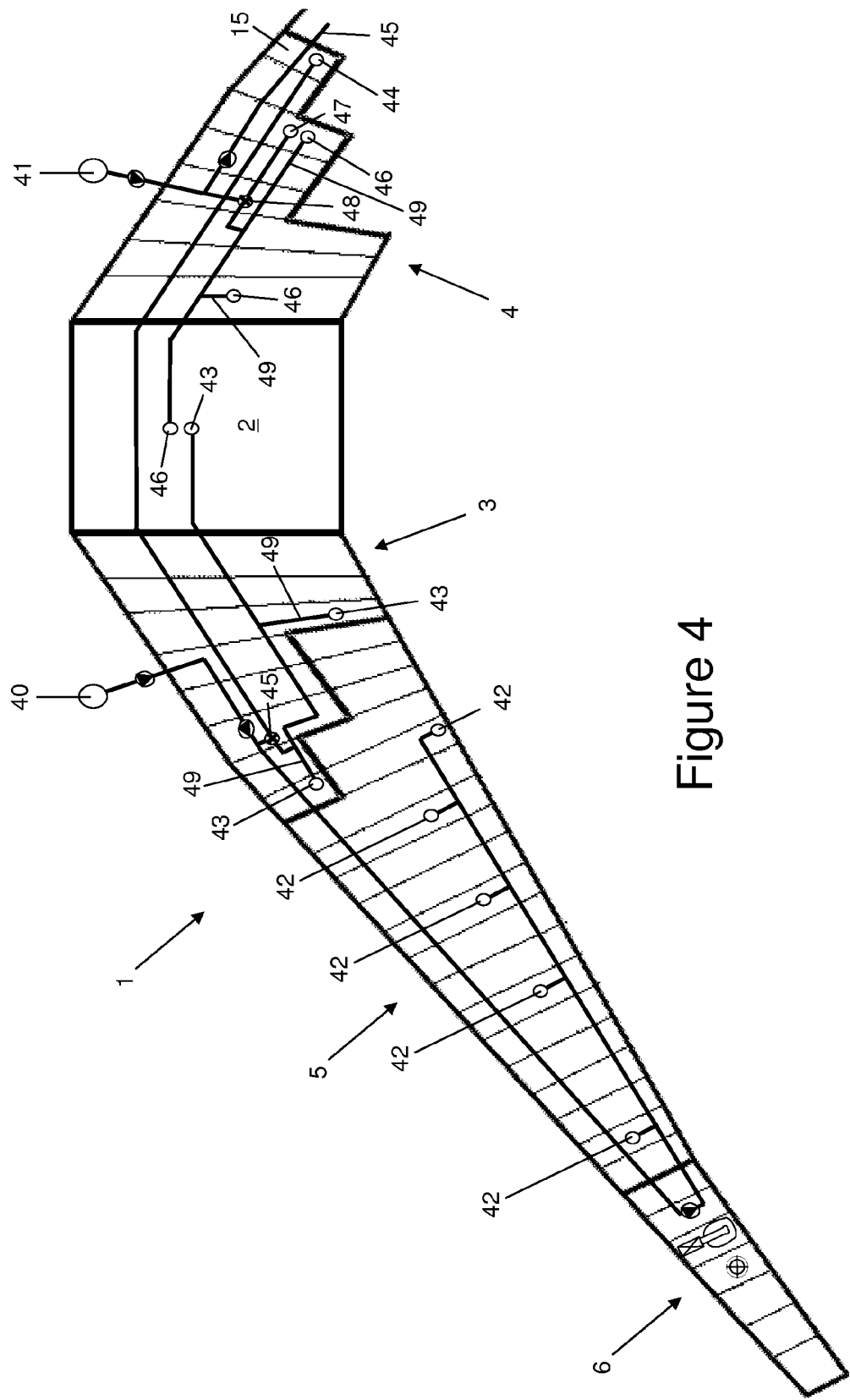
FIG. 4 is a plan view of the system with the venting system omitted.

FIG. 4 shows the inerting system. The inerting system comprises a pair of oxygen-depleted gas sources 40,41 each connected to a respective network of pipes and inerting nozzles. The gas sources may be ASMs of the kind described in U.S. Pat. No. 7,204,868, or any other source of oxygen-depleted gas such as nitrogen-enriched air (NEA).

The source 40 is connected by various pipes and one-way valves to a first set of inerting nozzles 42 in the tank 5, a second set of inerting nozzles 43 in the bay 2 and compartment 3, and a third inerting nozzle 44 in the bay 15. A control valve 45 is provided with two settings: a first (cruise) setting in which the ASM 40 is coupled to the nozzle 44 and decoupled from the nozzles 43, and a second (descent) setting in which the ASM 40 is coupled to the nozzles 43 and decoupled from the nozzle 44.

Figure 6:
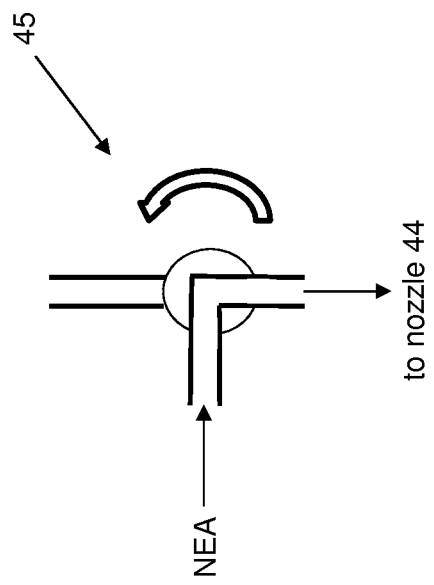
FIG. 6 is a schematic view of the control valve in its descent setting.
Figure 5:
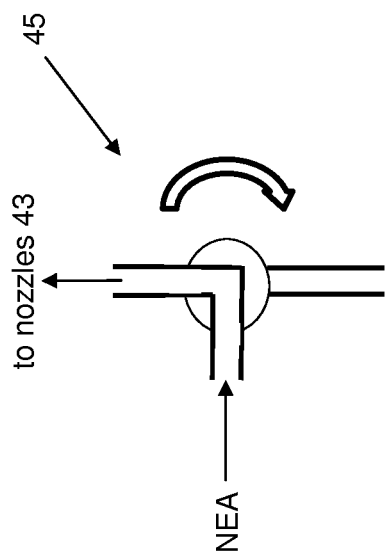
FIG. 5 is a schematic view of a control valve in its cruise setting.

FIG. 5 shows the valve 45 in its cruise setting in which NEA is directed to the nozzles 43, and FIG. 6 shows the valve 45 in its descent setting in which NEA is directed to the nozzle 44.

The source 41 is connected by various pipes and one-way valves to a first set of inerting nozzles (not shown) in the starboard outer wing tank (not shown) via a pipe 45, a second set of inerting nozzles 46 in the centre bay 2 and compartment 4, and a third inerting nozzle 47 in the sixth bay of the compartment 4. A control valve 48 is provided with two settings: a first (cruise) setting in which NEA is directed to the nozzles 46 and a second (descent) setting in which NEA is directed to the nozzle 47.

Note that the ASM 41 is decoupled from the ASM 40, i.e. there is no connection between the ASM 41 and the nozzle 44. Note also that the inerting system of FIG. 4 is completely independent of the venting system of FIG. 3 (unlike in U.S. Pat. No. 7,204,868) so the ASMs 40, 41 are coupled to the inerting nozzles without passing through the venting system.

During ascent of the aircraft the external air pressure decreases, and gas is vented from the fuel tank system into the surge tanks by the venting system shown in FIG. 3. In the ascent phase it is not necessary to introduce NEA into the fuel tanks, so the ASMS 40, 41 can optionally be turned off during this phase.

During cruise of the aircraft, fuel is gradually burned and NEA is introduced into the ullage of the fuel tanks by the inerting system to prevent an increase of oxygen concentration. The valves 45,48 are adjusted to their cruise settings to direct NEA to the nozzles 43,46 instead of the nozzles 45,47. Therefore during cruise, no NEA is introduced directly into the bay 15. Instead, NEA is introduced relatively evenly into the fuel tank system via the nozzles 42, 43, 46. During cruise NEA is introduced into the starboard compartment 4 at a rate Fs(cruise), into the port compartment 3 at a rate Fp(cruise), and into the centre bay 2 at a rate Fc(cruise).

The volumes of the tanks 2,3,4 are 45%, 27.5% and 27.5% respectively of the total volume of the centre tank, and the flow rates Fs, Fb and Fc are scaled accordingly so that:

Fs(cruise)·Fp(cruise)·2Fc(cruise).

This difference in flow rate can be achieved by making the NEA nozzles in the compartments 3, 4 smaller than the NEA nozzles in the centre bay 2, or equivalently by placing appropriately sized orifice plates in the NEA distribution pipes 49 which lead to the NEA nozzles in the compartments 3, 4.

The cruise setting of the valves 45, 48 results in NEA being introduced more evenly throughout the fuel tank during cruise. This is beneficial because if a large amount of NEA is introduced into the bay 15 during cruise then it will have the tendency to expel overboard via the vent nozzles 26. It is therefore not an optimum architecture to target NEA to the bay 15 during cruise as well as during descent.

During descent of the aircraft, the external air pressure increases, causing a pressure differential which tends to drive air into the fuel tanks via the venting system. Since the vent pipe 21 and vent nozzles 26 have a much larger diameter than the vent pipes 27, 28 and vent nozzles 23, 29-34, oxygen-rich air tends to flow out of each individual nozzle 27 at a higher rate than out of each individual nozzle 29-33. Also, the total air flow rate into the bay 15 from the two vent nozzles 26 is much greater than the total air flow rate from all of the other nozzles 29-34 combined. For instance 80% of the flow from the vent pipe 21 may exit via the larger vent nozzles 26, and only 20% via the smaller nozzles 29-34 combined.

To offset this unequal venting capacity, the valves 45,48 are turned to their second settings either during descent or shortly before descent, to direct NEA to the nozzles 44,47 instead of the nozzles 43,46. Thus, during descent NEA is introduced into the starboard compartment 4 at a high rate Fs(descent) which is much greater than Fs(cruise), whereas no NEA is introduced into the port compartment 3 or centre bay 2 (other than by passing through the ribs 9).

In an alternative embodiment, during descent a small amount of NEA may be introduced by the inerting system into the port compartment 3 or centre bay 2 at rates Fp(descent) and Fc(descent) respectively. In this alternative case:

$Fs(descent) > Fp(descent)$; and $Fs(descent) > Fc(descent)$.

Figure 7:
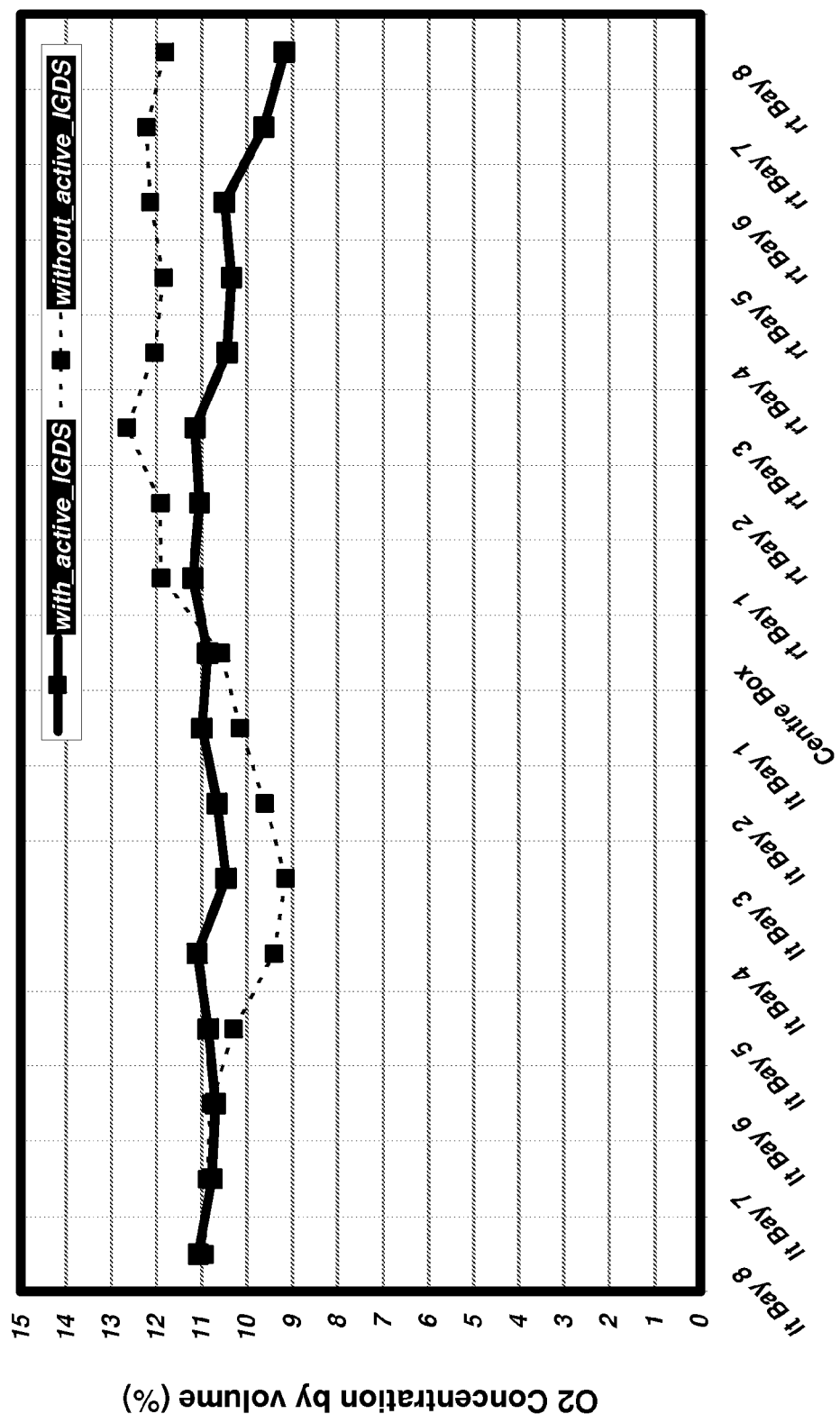
FIG. 7 is a graph illustrating the benefit of the active inerting system.

FIG. 7 is a graph illustrating the benefit of the active inerting system. The dashed line in FIG. 7 shows the oxygen concentration in each bay as the aircraft lands, without the active inerting system shown in the figures. More specifically the dashed line in FIG. 7 shows the oxygen concentration in the absence of the inerting nozzles 44, 47 and valves 45,48. The solid line in FIG. 7 shows the oxygen concentration in each bay as the aircraft lands, with the active inerting system as shown in the figures. FIG. 7 uses the assumption that the oxygen concentration in all bays is 3% at the top of descent.

In both cases the oxygen concentration in the centre bay 2 is 11% by volume. However, without the active inerting system the oxygen concentration in the port inner wing tank compartment 3 (labelled lt Bay 1-lt Bay 8 in FIG. 7) is on average about 10%, and the oxygen concentration in the starboard inner wing tank compartment 4 (labelled rt Bay 1-rt Bay 8 in FIG. 7) is on average about 12%. This is because a large amount of oxygen-rich air has entered the starboard wing tank compartment 4 via the vent nozzles 26. Although the oxygen concentration in the starboard inner wing tank compartment 4 will eventually reduce to about 11% due to the transfer of gases across the ribs 9 and intermediate ribs, such a high oxygen concentration is not desirable.

By contrast, the solid line in FIG. 7 shows that with the active inerting system the oxygen concentration in the port inner wing tank compartment 3 (labelled lt Bay 1-lt Bay 8 in FIG. 7) is on average about 11%, and the oxygen concentration in the starboard inner wing tank compartment 4 (labelled rt Bay 1-rt Bay 8 in FIG. 7) is on average slightly below 11%. Although during descent the oxygen concentration in the centre bay 2 and port inner wing tank compartment 3 increases slightly relative to the starboard inner wing tank compartment 4, after a certain amount of time on the ground after landing, gas will transfer between them to equalise the oxygen concentration between them.

Although the invention has been described above with reference to one or more preferred embodiments, it will be appreciated that various changes or modifications may be made without departing from the scope of the invention as defined in the appended claims.

The invention claimed is:

1. An aircraft fuel system comprising:
a. a fuel tank with first and second cells separated by one or more baffles, the baffles permitting the flow of fluid between the first and second cells;
b. a venting system for reducing any pressure difference between an interior and an exterior of the fuel tank, the venting system comprising one or more vent nozzles which are positioned within the fuel tank and in fluid communication with one or more vent ports, wherein the venting system has a venting capacity associated with each cell, and wherein the venting capacity associated with the first cell is greater than the venting capacity associated with the second cell, which may be zero; and
c. an inerting system comprising:
 i. one or more gas sources for generating oxygen-depleted gas;
 ii. one or more inerting nozzles for injecting oxygen-depleted gas from the gas source(s) into the first cell, where F1 is the sum of the oxygen-depleted gas flow rates from the inerting nozzle(s) into the first cell;
 iii. one or more inerting nozzles for injecting oxygen-depleted gas from the gas source(s) into the second cell, where F2 is the sum of the oxygen-depleted gas flow rates from the inerting nozzle(s) into the second cell; and
 iv. a control device for varying the ratio F1/F2 between the flow rates into the first and second cells, wherein the one or more vent nozzles comprise a large vent nozzle in the first cell and a small vent nozzle in the second cell with a smaller cross-sectional flow area than the large vent nozzle, wherein the large vent nozzle is arranged so that gas can be vented from the first cell during ascent of the aircraft through the large vent nozzle and so that air can be fed into the first cell during descent of the aircraft through the large vent nozzle, and wherein the small vent nozzle is arranged so that gas can be vented from the second cell during ascent of the aircraft through the small vent nozzle and so that air can be fed into the second cell during descent of the aircraft through the small vent nozzle.

2. The system of claim 1, wherein at least one of the cells comprises a bay with no internal baffles.

3. The system of claim 1, wherein at least one of the cells comprises a compartment containing one or more internal baffles which divide the compartment into a number of bays and permit the flow of fluid between the bays.

4. The system of claim 1 wherein the second cell contains no vent nozzles, and thus has a vent nozzle capacity of zero.

5. The system of claim 1 wherein the first cell is located in a wing of the aircraft and the second cell is located under a fuselage of the aircraft.

6. An aircraft fuel system comprising:
a. a fuel tank with first and second cells separated by one or more baffles, the baffles permitting the flow of fluid between the first and second cells;
b. a venting system for reducing any pressure difference between the interior and the exterior of the fuel tank, the venting system comprising one or more vent nozzles which are positioned within the fuel tank and in fluid communication with one or more vent ports, wherein the venting system has a venting capacity associated with each cell, and wherein the venting capacity associated with the first cell is greater than the venting capacity associated with the second cell, which may be zero; and
c. an inerting system comprising:
 i. one or more gas sources for generating oxygen-depleted gas;
 ii. one or more inerting nozzles for injecting oxygen-depleted gas from the gas source(s) into the first cell, where F1 is the sum of the oxygen-depleted gas flow rates from the inerting nozzle(s) into the first cell;
 iii. one or more inerting nozzles for injecting oxygen-depleted gas from the gas source(s) into the second cell, where F2 is the sum of the oxygen-depleted gas flow rates from the inerting nozzle(s) into the second cell; and
 iv. a control device for varying the ratio F1/F2 between the flow rates into the first and second cells,
wherein the inerting system comprises a network of inerting pipes which couple the inerting nozzles in both cells to a common gas source, and wherein the control device comprises a valve with a first setting in which the common gas source is coupled to the nozzle(s) in the first cell and decoupled from the nozzle(s) in the second cell, and a second setting in which the common gas source is coupled to the nozzle(s) in the second cell and decoupled from the nozzle(s) in the first cell.

7. The system of claim 1 wherein the (or each) gas source is coupled to the inerting nozzles without passing through the venting system.

8. The system of claim 1 wherein the venting system has a minimum cross-sectional flow area associated with each vent nozzle, and the total cross-sectional flow area associated with the vent nozzles in each cell of the fuel tank defines the venting capacity associated with that cell.

9. A method of operating an aircraft fuel tank system, the fuel tank system comprising: a fuel tank with first and second cells separated by one or more baffles; a venting system comprising one or more vent nozzles which are positioned within the fuel tank; and an inerting system comprising one or more inerting nozzles in the first cell and one or more inerting nozzles in the second cell, the method comprising:
  a. during cruise of the aircraft:
    i. introducing oxygen-depleted gas into the first cell at a flow rate F1(cruise), wherein F1 (cruise) is the sum of the oxygen-depleted gas flow rates from the inerting nozzle(s) into the first cell and wherein F1(cruise) may be zero; and
    ii. introducing oxygen-depleted gas into the second cell at a flow rate F2(cruise), wherein F2(cruise) is the sum of the oxygen-depleted gas flow rates from the inerting nozzle(s) into the second cell; and
  b. during descent of the aircraft:
    i. operating the venting system to introduce air into at least the first cell through one or more of the vent nozzles in order to reduce a pressure difference between the interior and the exterior of the fuel tank, wherein the total air flow rate from the venting system into the first cell is greater than the total air flow rate from the venting system into the second cell, which may be zero;
    ii. introducing oxygen-depleted gas into the first cell at a flow rate F1 (descent), wherein F1(descent) is the sum of the oxygen-depleted gas flow rates from the inerting nozzle(s) into the first cell; and
    iii. introducing oxygen-depleted gas into the second cell at a flow rate F2(descent), wherein F2(descent) is the sum of the oxygen-depleted gas flow rates from the inerting nozzle(s) into the second cell and wherein F2(descent) may be zero; and
  c. after step b., permitting gas to flow across the baffle(s) between the cells in order to reduce any difference in oxygen concentration between them,
wherein the ratio of oxygen-depleted gas flow rates F1(descent)/F2(descent) during descent is greater than the ratio of oxygen-depleted gas flow rates F1 (cruise)/F2(cruise) during cruise.

* * * * *